United States Patent
Chatterjee et al.

(10) Patent No.: US 6,675,195 B1
(45) Date of Patent: Jan. 6, 2004

(54) METHOD AND APPARATUS FOR REDUCING INEFFICIENCIES CAUSED BY SENDING MULTIPLE COMMANDS TO A SERVER

(75) Inventors: Debashish Chatterjee, Fremont, CA (US); Lekshminarayanan "Luxi" Chidambaran, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 08/873,644

(22) Filed: Jun. 11, 1997

(65) Prior Publication Data (65)

(51) Int. Cl.⁷ .............................................. G06F 15/16
(52) U.S. Cl. ...................... 709/203; 709/101; 707/10
(58) Field of Search ...................... 709/203, 231, 709/232, 233, 235, 100, 101, 102, 103, 105; 710/52, 5, 53, 54, 56, 57, 58, 59, 60; 707/9, 10, 1

(56) References Cited

U.S. PATENT DOCUMENTS

| | | | | |
|---|---|---|---|---|
| 5,253,341 A | * | 10/1993 | Rozmanith et al. | 709/200 |
| 5,426,421 A | * | 6/1995 | Gray | 340/3.32 |
| 5,432,841 A | * | 7/1995 | Rimer | 455/457 |
| 5,440,623 A | * | 8/1995 | Moore et al. | 379/88.26 |
| 5,469,545 A | * | 11/1995 | Vanbuskirk et al. | 709/234 |
| 5,504,928 A | * | 4/1996 | Cook et al. | 710/62 |
| 5,596,750 A | * | 1/1997 | Li et al. | 709/101 |
| 5,613,155 A | * | 3/1997 | Baldiga et al. | 709/232 |
| 5,616,876 A | * | 4/1997 | Cluts | 84/609 |
| 5,632,015 A | * | 5/1997 | Zimowski et al. | 707/3 |
| 5,692,192 A | * | 11/1997 | Sudo | 709/105 |
| 5,699,523 A | * | 12/1997 | Li et al. | 709/237 |
| 5,740,175 A | * | 4/1998 | Wakeman et al. | 370/422 |
| 5,760,789 A | * | 6/1998 | Inoue | 345/501 |
| 5,761,507 A | * | 6/1998 | Govett | 709/101 |
| 5,774,660 A | * | 6/1998 | Brendel et al. | 709/100 |
| 5,774,718 A | * | 6/1998 | Aoshima et al. | 709/100 |
| 5,778,225 A | * | 7/1998 | Supernaw-Issen et al. | 709/103 |
| 5,781,703 A | * | 7/1998 | Desai et al. | 706/50 |
| 5,790,800 A | * | 8/1998 | Gauvin et al. | 709/227 |
| 5,799,141 A | * | 8/1998 | Galipeau et al. | 714/13 |
| 5,799,173 A | * | 8/1998 | Gossler et al. | 703/21 |
| 5,805,920 A | * | 9/1998 | Sprenkle et al. | 710/1 |
| 5,822,749 A | * | 10/1998 | Agarwal | 707/2 |
| 5,822,772 A | * | 10/1998 | Chan et al. | 711/158 |
| 5,825,769 A | * | 10/1998 | O'Reilly et al. | 370/360 |
| 5,826,020 A | * | 10/1998 | Randell | 709/201 |
| 5,835,904 A | * | 11/1998 | Vicik et al. | 707/1 |
| 5,845,076 A | * | 12/1998 | Arakawa | 709/203 |

(List continued on next page.)

OTHER PUBLICATIONS

Todd Tannenbaum, Network Computing, "Internet Rx", Sep. 1997.*

Micha Hofri, Analysis of Interleaved Storage via a Constant–Service Queuing System with Markov–Chain–Driven Input, Jul. 1984.*

*Primary Examiner*—David Wiley
*Assistant Examiner*—William C. Vaughn, Jr.
(74) *Attorney, Agent, or Firm*—Christian A. Nicholes; Hickman Palermo Truong & Becker LLP

(57) ABSTRACT

A method and apparatus can improve the performance of a server and clients by storing commands sent to the server until a command is received that fills the capacity of the apparatus to store the commands or that will cause the server to provide information beyond acknowledgment of or completion of the command. The commands are then set to the server software for execution. The server then processes as a group the commands stored, returning a single response, and eliminating the overhead that could have been incurred in providing multiple responses or processing the commands separately.

18 Claims, 9 Drawing Sheets

U.S. PATENT DOCUMENTS

| | | | | |
|---|---|---|---|---|
| 5,854,754 A | * | 12/1998 | Cabrera et al. | 703/2 |
| 5,857,188 A | * | 1/1999 | Douglas | 707/9 |
| 5,872,931 A | * | 2/1999 | Chivaluri | 709/202 |
| 5,881,238 A | * | 3/1999 | Aman et al. | 709/226 |
| 5,881,269 A | * | 3/1999 | Dobbelstein | 703/21 |
| 5,887,139 A | * | 3/1999 | Madison, Jr. et al. | 709/203 |
| 5,892,914 A | * | 4/1999 | Pitts | 709/219 |
| 5,915,092 A | * | 6/1999 | Morita et al. | 709/213 |
| 5,923,896 A | * | 7/1999 | Young | 710/5 |
| 5,925,098 A | * | 7/1999 | Freund et al. | 709/203 |
| 5,944,823 A | * | 8/1999 | Jade et al. | 713/201 |
| 5,946,498 A | * | 8/1999 | Chiang et al. | 709/207 |
| 5,948,062 A | * | 9/1999 | Tzelnic et al. | 709/219 |
| 5,956,489 A | * | 9/1999 | San Andres et al. | 709/221 |
| 5,956,509 A | * | 9/1999 | Kevner | 709/203 |
| 5,963,556 A | * | 10/1999 | Varghese et al. | 370/401 |
| 5,974,441 A | * | 10/1999 | Rogers et al. | 709/200 |
| 5,978,577 A | * | 11/1999 | Rierden et al. | 707/10 |
| 5,978,802 A | * | 11/1999 | Hurvig | 707/8 |
| 5,978,845 A | * | 11/1999 | Reisacher | 709/202 |
| 5,991,374 A | * | 11/1999 | Hazenfield | 379/101.01 |
| 6,006,016 A | * | 12/1999 | Faigon et al. | 714/26 |
| 6,006,266 A | * | 12/1999 | Murphy et al. | 709/227 |
| 6,012,083 A | * | 1/2000 | Savitzky et al. | 707/10 |
| 6,018,779 A | * | 1/2000 | Blumenau | 710/68 |
| 6,035,424 A | * | 3/2000 | Freerksen et al. | 714/40 |
| 6,058,413 A | * | 5/2000 | Flores et al. | 709/101 |
| 6,115,741 A | * | 9/2000 | Domenikos et al. | 709/217 |
| 6,119,143 A | * | 9/2000 | Dias et al. | 709/201 |
| 6,128,016 A | * | 10/2000 | Coelho et al. | 345/808 |
| 6,151,610 A | * | 11/2000 | Senn et al. | 715/516 |
| 6,182,151 B1 | * | 1/2001 | Cheng et al. | 709/101 |
| 6,192,389 B1 | * | 2/2001 | Ault et al. | 709/101 |
| 6,230,156 B1 | * | 5/2001 | Hussey | 707/10 |
| 6,243,725 B1 | * | 6/2001 | Hempleman et al. | 715/530 |
| 6,295,551 B1 | * | 9/2001 | Roberts et al. | 709/205 |
| 6,496,865 B1 | * | 12/2002 | Sumsion et al. | 709/229 |

* cited by examiner

METHOD AND APPARATUS FOR REDUCING INEFFICIENCIES CAUSED BY SENDING MULTIPLE COMMANDS TO A SERVER

RELATED APPLICATIONS

The subject matter of this application is related to the subject matter of application Ser. No. 08/873,057 entitled, "Method and Apparatus for Switching Client Sessions in a Server"filed on Jun. 11, 1997 by John Bellemore, Debashish Chatterjee and Amit Jasuja and to the subject matter of application Ser. No. 08/873,385 entitled, "Method and Apparatus for Reducing the Number of Data Requests Made to a Server"filed on Jun. 11, 1997 by Debashish Chatterjee, Luxi Chidambaran and Mohammad S. Lari, and to the subject matter of application Ser. No. 08/872,529 entitled, "Method and Apparatus for Coupling Clients to Servers-"filed on Jun. 11, 1997 by Debashish Chatterjee, John Bellemore and Amit Jasuja, each having the same assignee as this application and each is incorporated herein by reference in its entirety.

FIELD OF THE INVENTION

The present invention relates to computer software, and more specifically to client-server computer software.

BACKGROUND OF THE INVENTION

Where a single repository of data is shared by many users, a client-server architecture may be adopted. Referring now to FIG. 1, four computers 110, 112, 114, 116 arranged using a client-server architecture are illustrated. In a client-server architecture, a server 110 is used to access a data repository storage device 102 that stores the data that is shared among the clients 112, 114, 116. Clients 112, 114, 116 can request the data from the server 110, process data, provide data to the server 110 and change data stored in the storage device 102 attached to the server 110. Users of the client-server system 100 use a client 112, 114 or 116 to communicate with the server 110 to access the shared data stored in the storage device 102. Clients 112, 114, 116 do not have direct access to the data in the storage device 102, but may request that the server 110 perform actions such as performing queries, or adding to, changing or deleting the data stored in the storage device 102 using server commands sent to the server 110.

Each client 112, 114, 116 is coupled to the server 110 by a connection 122, 124 or 126 between the clients 112, 114, 116 and the server 110. Each connection 122, 124, 126 may be physically separate as shown in FIG. 1, or may be shared using a local area network, or LAN. Ports 142, 144, 146 in each of the clients 112, 114, 116 and the associated cabling provide the OSI layers 1-2 connectivity between the ports 132, 134, 136 of the server 110. If the server 110 will communicate with each client 112, 114, 116 over a LAN, a single LAN interface port may physically replace ports 132, 134, 136, and ports 132, 134, 136 are treated as logical ports.

As the user of each client 112, 114 or 116 performs work, the corresponding client 112, 114 or 116 will send commands to the server 110. Each command from a client 112, 114, 116 is processed by the server 110, which next sends to the client 112, 114, 116 a confirmation that the command has been processed. Until this confirmation is received, the client 112, 114, 116 will wait to send additional commands to the server 110. If a task requires two or more commands to be sent to a server 110 by one of the clients 112, 114, 116, two kinds of inefficiencies result.

The first inefficiency is that the client 112, 114, 116 ties up a port 132, 134, 136 on the server 110 longer than may be necessary because it will wait to receive the confirmation from one command before sending a subsequent command. Where ports 132, 134, 136 are shared among multiple clients as described in copending application Ser. No. 08/873,057 and 08/872,529,"the delay in releasing the port while waiting for the command confirmation can impact the performance of the other clients which may try to use the port 132, 134, 136.

The second inefficiency is in the processing of the commands by the server 110. The server software in the server 110 may execute commands from multiple clients 112, 114, 116 with a separate server process for each. If there is a delay between the first and second commands from the single client 112, 114 or 116, the server software in the server 110 may execute commands from other clients 112, 114, 116, requiring the server to incur the overhead of switching from process to process, reducing the throughput and performance of the server 110 to a level lower than would be achievable without the overhead.

A system which allows commands from multiple clients to be switched among a single process, such as is described in copending application Ser. No. 08/872,529, can reduce the overhead associated with changing processes when the two clients sending commands share the same process, however, the overhead associated with switching the session associated with the client can cause similar throughput and performance degradation.

It is desirable to shorten the total period of time that a client 112, 114, 116 is required to use a port 132, 134, 136 on a server 110 to submit a multiple-command task, and to reduce the amount of processing overhead required for the server 110 to execute multiple server commands.

SUMMARY OF INVENTION

In accordance with the present invention, a device such as a client or a controller determines whether a command to be sent by a client will require a response from the server. Commands that will generate no response other than the command confirmation to the client are queued until a command that will produce a server response other than the command confirmation is also ready to be sent to the server. All of these commands are then sent together as a group, and optionally identified as requiring a single group response from the server. The server can provide a single response for the group, reducing the total time the port on the server is required to be in communication with the client. In addition, because all of the commands are available to the server at the same time, they may be executed in the most efficient fashion by the server.

BRIED DESCRIPTION OF THE DRAWINGS

DETAILED OF A PREFERRED EMBODIMENT

In one embodiment, the present invention is implemented as computer software running on conventional computer systems, although other implementations may be used. Although the term "module" is used throughout, a module need not be implemented as computer software in a single unit, rather the functions of a module may be dispersed throughout many portions of computer software.

Figure 2:
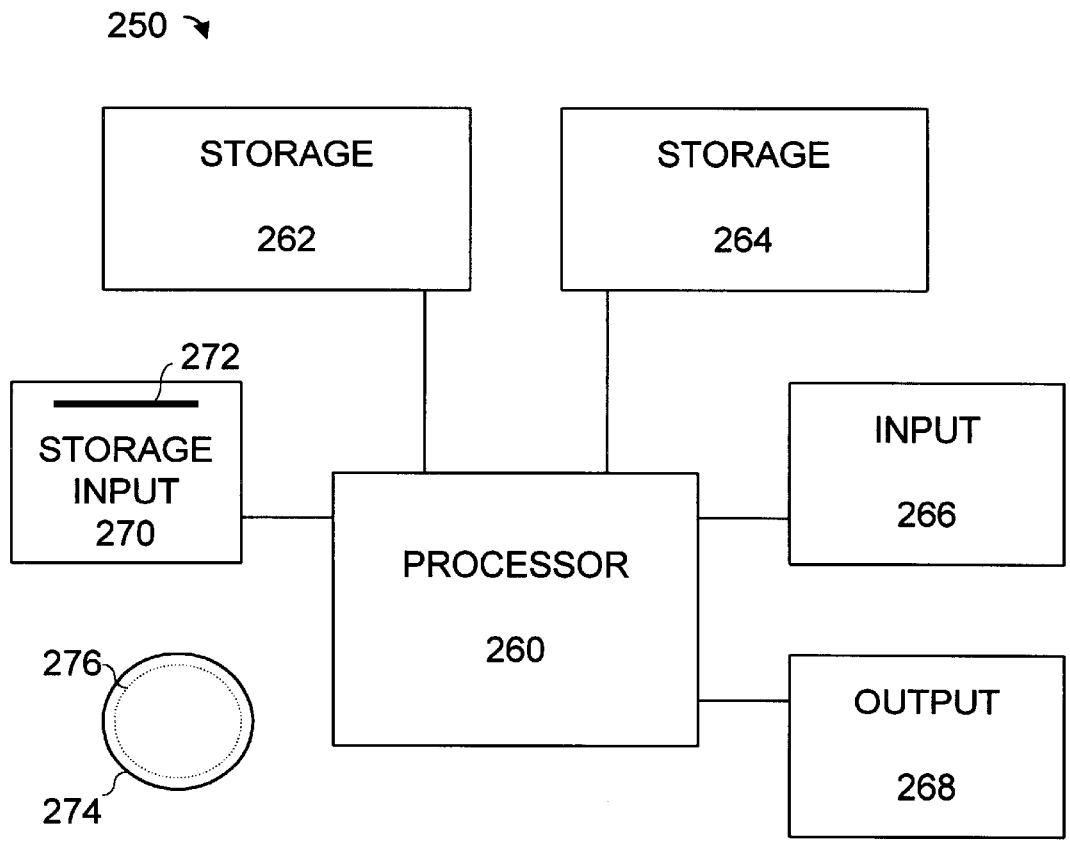
FIG. 2 is a block schematic diagram of a conventional computer system.

Referring now to FIG. 2, a conventional computer system 250 for practicing the present invention is shown. Processor 260 retrieves and executes software instructions stored in storage 262 such as memory which may be Random Access Memory (RAM) and may control other components to perform the present invention. Storage 262 may be used to store program instructions or data or both. Storage 264, such as a computer disk drive or other nonvolatile storage, may provide storage of data or program instructions. In one embodiment, storage 264 provides longer term storage of instructions and data, with storage 262 providing storage for data or instructions that may only be required for a shorter time than that of storage 264. Input device 266 such as a computer keyboard or mouse or both allows user input to the system 250. Output 268, such as a display or printer, allows the system to provide information such as instructions, data or other information to the user of the system 250. Storage input device 270 such as a conventional floppy disk drive or CD-ROM drive accepts via input 272 computer program products 274 such as a conventional floppy disk or CD-ROM that may be used to transport computer instructions or data to the system 250. Computer program product 274 has encoded thereon computer readable program code devices 276, such as magnetic charges in the case of a floppy disk or optical encodings in the case of a CD-ROM which are encoded to configure the computer system 250 to operate as described below.

Figure 1:
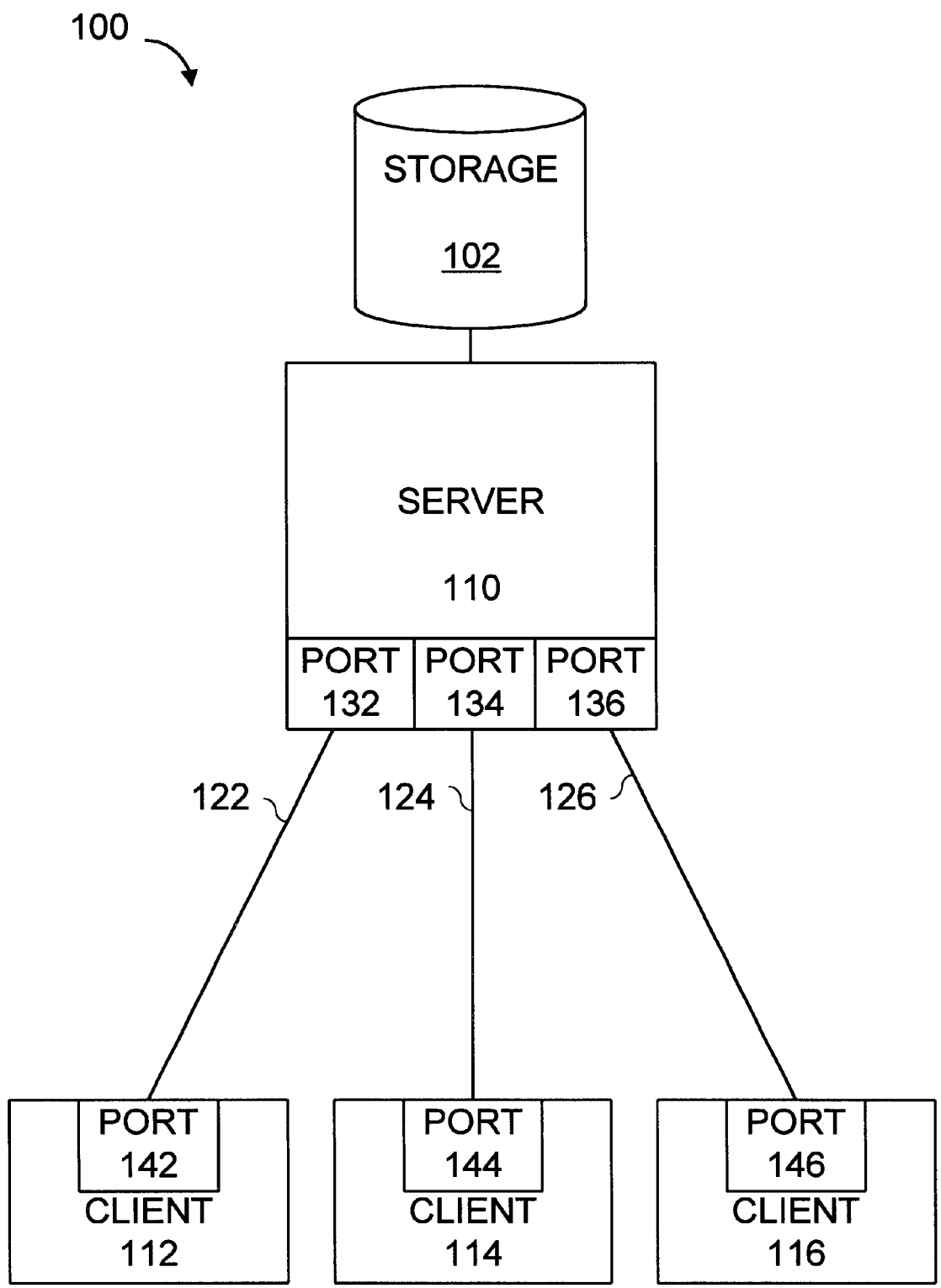
FIG. 1 is a block schematic diagram of four conventional computers and a conventional storage device coupled in a conventional client-server architecture.

As an example embodiment, the arrangement shown in FIG. 1 may utilize four different computer systems, one each for the server 110, and one for each of the three clients 112, 114, 116. Referring now to FIGS. 1 and 2, in one embodiment, each system 250 for the clients 112, 114, 116 is a conventional IBM compatible computer running the Microsoft Windows 95 operating system, and the system 250 for the server 110 is a conventional Sun Microsystems Ultra 1 Creator computer running the Solaris 2.5.1 operating system commercially available from Sun Microsystems of Mountain View, Calif., although other systems may be used.

Figure 3A:
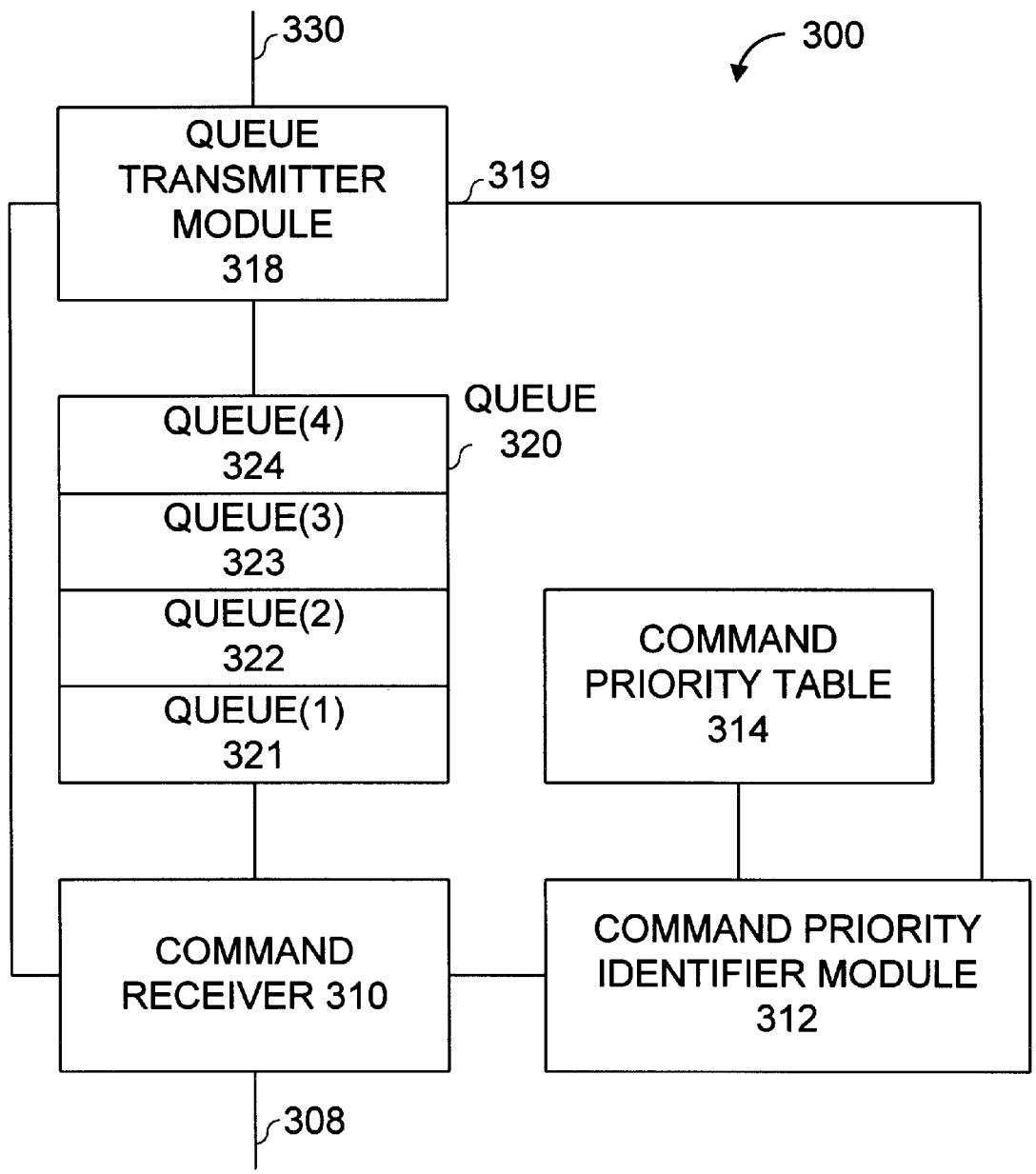
FIG. 3A is a block schematic diagram of an apparatus that stores and forwards server commands according to one embodiment of the present invention.

Referring now to FIG. 3A, a server command store and forward apparatus 300 according to one embodiment of the present invention is shown. Command receiver module 310 receives server commands from client application software coupled to input 308. Each server command contains a command code describing the command to be performed, and may contain one or more parameters used by the server in performing the command. Command receiver module 310 places the command received into the head 324 of the queue 320, which may be an area of storage such as memory or disk, and copies all or a portion of the command code into the command priority identifier module 312.

In one embodiment, command priority identifier module 312 identifies the priority of the command by comparing the portion of the command code it receives with a table of portions of command codes stored in command priority table 314 which contains a list of all high priority command codes, low priority command codes or both. In one embodiment, high priority commands are commands that generate an information response from the server. An information response is a response that provides information other than confirmation of the receipt or completion of the command or an error code. In one embodiment, commands such as "cancel" and "close cursor" do not generate an information response from the server, and are therefore not high priority commands. Instead, these commands are low priority commands.

In one embodiment, the high priority commands may be identified by the command code itself being in a certain range of values or having a particular bit or bits in a particular pattern, and the command priority identifier module 312 can identify the priority of each command by matching the values or patterns without using the command priority table 314.

If the command priority identifier module 312 does not identify the command as a high priority command, the system 310 does not send the received command to the server, but stores the command in the head 324 of the queue 320 and can accept additional commands via input 308. Additional commands are queued in the order received in the queue 320. Command receiver module 310 maintains the next location 324, 323, 322, 321 in the queue 320 in which to store commands as they are received so that commands are stored in the smallest possible space in the queue 320 and commands not transmitted are not overwritten.

When a high priority command is received by command receiver module 310 and placed in the queue 320, command priority identifier module 312 identifies the command as a high priority command as described above, and signals queue transmitter module 318 via trigger input 319 that the commands in the queue should be transmitted to output 330 coupled to the server.

In one embodiment, upon receiving this signal from command priority identifier module 312, queue transmitter module 318 sends to the server via output 320 the commands in the queue 320 one at a time in the order received.

In one embodiment, queue transmitter module 318 generates and sends to the server via output 330 in advance of the commands that were in the queue 320 a command that identifies the commands as a group of multiple commands, so as to inform the server that a single response is desired for all of the commands. In one embodiment, the queue transmitter module 318 queries command receiver module 310 for the number of commands in the queue 320, and the separate command generated by the queue transmitter module 318 contains a parameter describing the number of commands in the queue 320. In another embodiment, the number of commands in the queue 320 is not part of the command generated by the queue transmitter module 318. Instead, a separate command is also generated and sent to the server via output 330 by queue transmitter module 318 following the transmission of all of the commands in the queue 320 to inform the server that it has received the last command in the group. The command is sent after the last command in the queue 320. The last command may be identified by queue transmitter module 318 querying command receiver module 310 to identify the number of commands in the queue 320 as described above. In another embodiment, queue transmitter module 318 does not query command receiver module 310, instead, the command codes for the commands queue transmitter module 318 transmits are also sent to command priority identifier module 312. Using the fact that any high priority command will be the last command in the queue 320, when command priority identifier module 312 identifies a command being transmitted as a high priority command, the command informing the server that the high priority command is the last command in the group is generated and sent by queue transmitter module 318 following the transmission of the commands sent in the queue 320. In another embodiment, command receiver module 310 generates the command informing the server and places it into the queue 320, and queue transmitter module 318 sends the entire contents of the queue 320.

In one embodiment, the command or commands generated by the queue transmitter module 318 are integrated into the first command at the head 324 of the queue 320, and/or the last command in the queue 320.

In one embodiment, command receiver module 310 counts the number of commands received in a counter, and if the queue 320 is full, command receiver module 310 instructs queue transmitter module 318 to transmit the queue 320 to the server, even if there is no high priority command in the queue. Command receiver module 310 also passes to queue transmitter module 318 the number of commands in the queue that is stored in the counter as described above, or queue transmitter module 318 counts the commands as they are sent, and if the number of commands sent equals the size of the queue 320, queue transmitter module 318 identifies to the server the end of the group as described above. Command receiver module 310 resets the counter to count the next group of commands it receives.

In one embodiment, it is not necessary for the apparatus 300 to identify the size or end of the group to the server as described above because the apparatus 300 will not send a response until it receives a high priority command or the number of commands sent sequentially equals the size of the queue, implicitly identifying the group of commands and its size to the server.

Figure 3B:
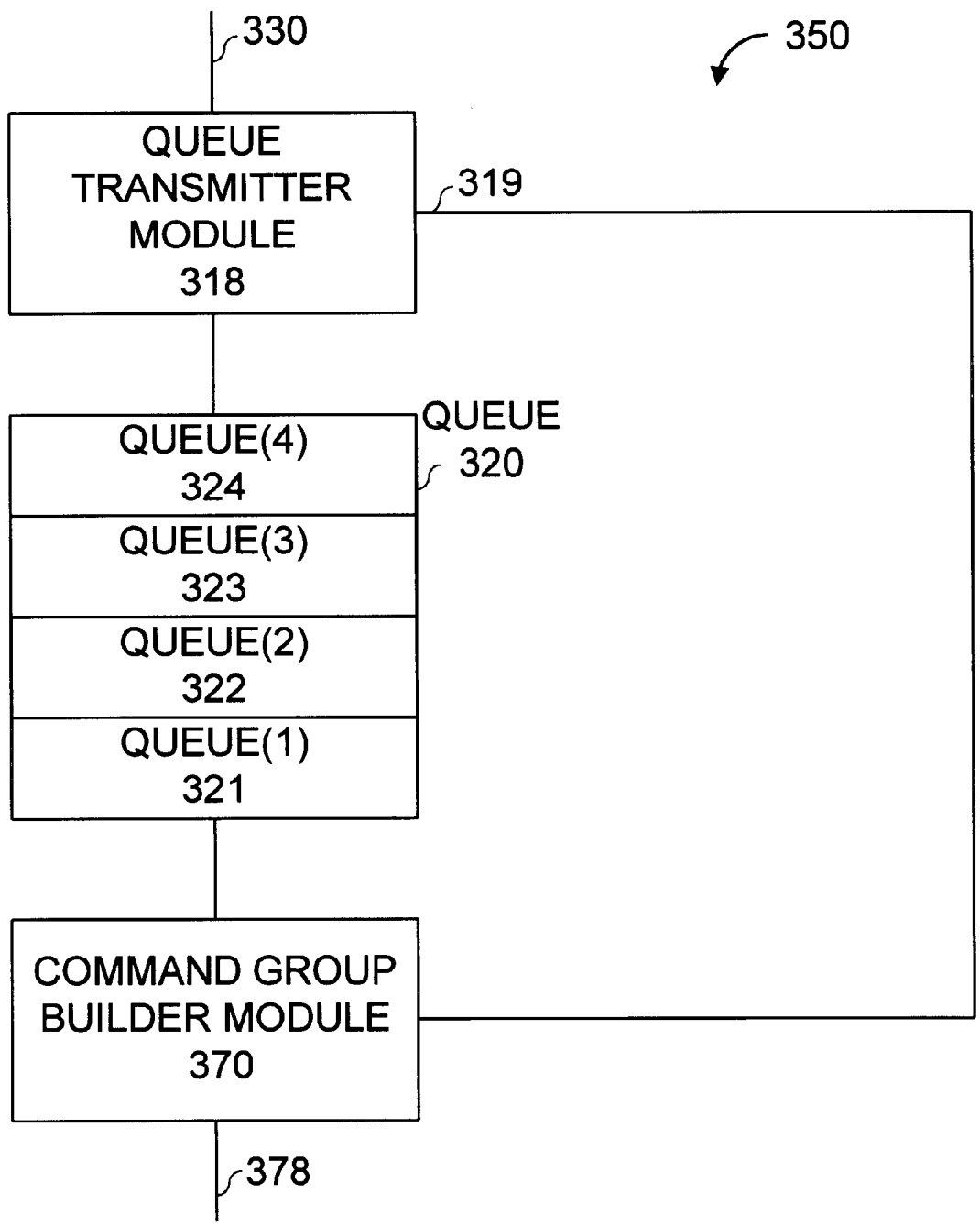
FIG. 3B is a block schematic diagram of an apparatus that stores and forwards server commands according to an alternate embodiment of the present invention.
Figure 4A:
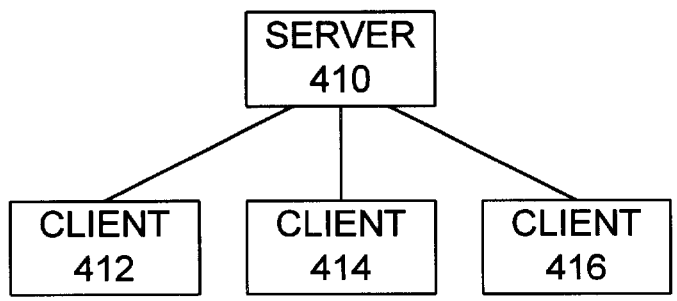
FIG. 4A is a block schematic diagram of four computers arranged using a client server architecture that may be used to implement the apparatus of FIG. 3A or 3B according to multiple embodiments of the present invention.
Figure 4B:
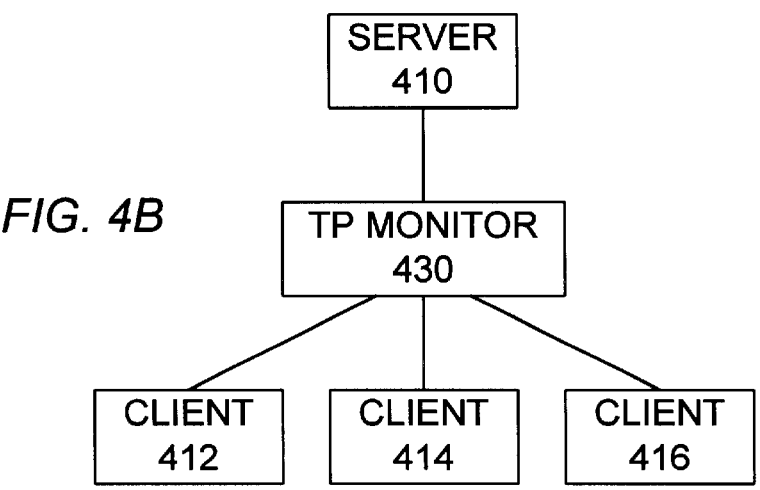
FIG. 4B is a block schematic diagram of four computers and a TP monitor arranged using a client server architecture that may be used to implement the system of FIG. 3A or 3B according to multiple embodiments of the present invention.
Figure 4C:
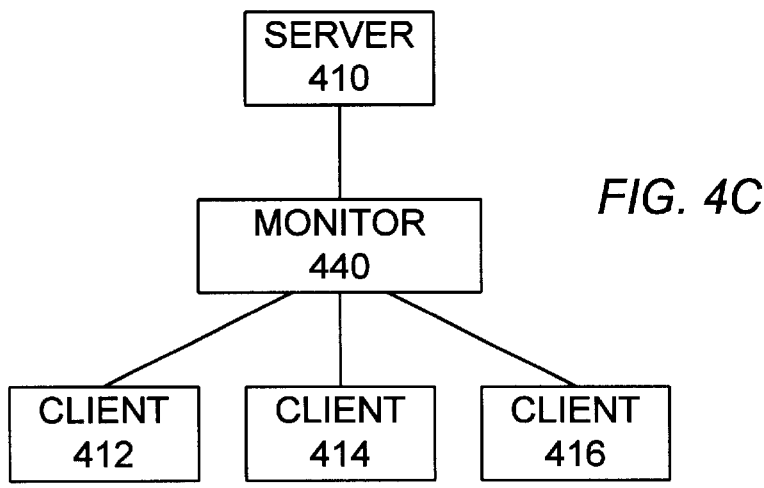
FIG. 4C is a block schematic diagram of five computers arranged using a client server architecture with a resource manager that may be used to implement the system of FIG. 3A or 3B according to multiple embodiments of the present invention.

It may not be necessary to for the apparatus to identify the high priority command among the commands to be sent if the originator of the high priority command can trigger the queue transmitter module 318. Referring now to FIG. 3B, a store and forward apparatus 350 according to an alternate embodiment of the present invention is shown. Command group builder module 370 receives via input 378 a server command and stores the command received in one of the positions 321, 322, 323, 324 of the queue 320. Command group builder adds one or more commands to one or more of the remaining positions 321, 322, 323, 324 of the queue 320 and signals trigger input 319 of the queue transmitter module 318 to transmit to the server via input/output 330 the contents of the queue.

The command received via input 308 may be stored in the queue 320 behind some or all of the commands added by command group builder 370. For example, if a server command is received for a server that allows session switching described in copending application Ser. No. 08/872,529, a session switching command may be required to precede it. Command group builder module 370 inserts the command received into position 323, builds a session switching command, inserts the command into position 324, and signals via trigger input 319 queue transmitter module 318 which transmits the two commands in the queue 320.

Referring now to FIGS. 3A, 3B 4A, 4B and 4C, the store and forward apparatus 300 or 350 of the present invention may be located in a conventional client 412, 414, 416 of a client server system, a conventional TP monitor 430 of a client server system or any other device 440 coupled between the client and the server such as a resource manager described in copending application Ser. No. 08/872,529. In one embodiment, the store and forward apparatus 300 is embodied as an application programming interface in the clients 412, 414, 416, TP monitor 430 or monitor 440. Where a TP monitor 430 is used, a server connection to the TP monitor 430 may be used in place of a client as described herein.

In one embodiment, multiple store and forward apparati 300 reside in the server 410, storing commands without execution until the commands are to be "transmitted to the server"as described above. In such embodiment, transmission to the server refers to transmission to the portion of the server 410 that causes the commands to be executed.

Figure 5:
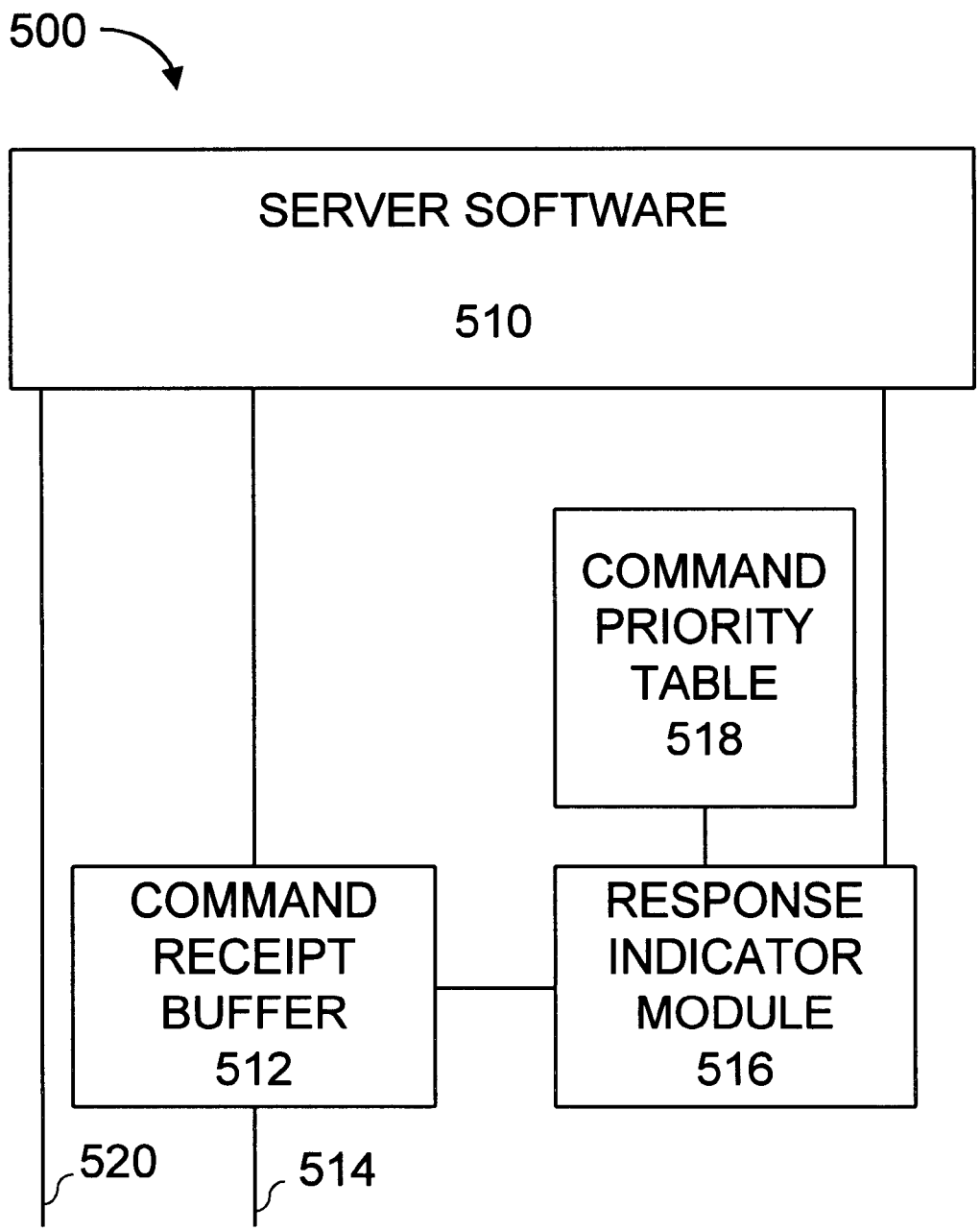
FIG. 5 is a block schematic diagram of a server according to one embodiment of the present invention.

Referring now to FIG. 5, a server 500 according to one embodiment of the present invention is shown. Server software 510 is similar to conventional server software such as the Oracle 7 software commercially available from Oracle Corporation of Redwood Shores, Calif. except as noted herein. Command receipt buffer 512 accepts commands via input 514, for example from the store and forward system of FIG. 3, and forwards them to server software 510.

In one embodiment, server software 510 does not send a response to commands unless signaled by response indicator module 516. In such embodiment, response indicator module 516 sends such a signal to server software 510 when the end of the group of commands is identified. In one embodiment, the end of the group is identified by a command flagging the end of the group of commands. Response indicator module 516 receives from command receipt buffer 512 the portion of the commands corresponding to the portion of the command that identifies the end of the group. In another embodiment, the end of the group is received when the number of commands specified in the beginning of the group command are received. In such embodiment, response indicator module 516 receives from command receipt buffer 512 the number of commands in the group as well as an indication of each command received, which response indicator module 516 uses to increment a counter, and signals server software 510 when the number of commands received indicated by the counter is equal to the number specified. In another embodiment, response indicator module 516 uses a counter described above and a table look up in command priority table 518 similar to the lookup of the command priority table described with reference to FIG. 3 and the counter described above to identify the end of the group as the command having a high priority or a number of commands indicated by the counter equal to the size of the queue described above. In one embodiment, if the queue size for each client coupled to the server 500 can have a different size, the size of each queue is maintained in command priority table 518 when a "size queue"command is received by command receipt buffer 512 which passes the command to response indicator module 516 to maintain the table and associate the queue size with the session identifier such as a session handle or server port. Response indicator module 516 then receives from command receipt buffer 512 the identifier in the command that switches the session or port identifier for use in determining the queue size for that session.

In one embodiment, server software 510 generates and sends via output 520 coupled to the device from which it received the command group a conventional response to the command received corresponding to the signal from response indicator module 510 as described above. In one embodiment, server software 510 sends a response to all commands unless signaled by response indicator module 516, and the signal generated by response generator 516 described above is inverted and used to suppress responses from being sent by the server software 510.

In one embodiment, after the server software 510 receives a command, server software 510 will not execute commands from other devices such as clients until the signal from response indicator module 516 indicating the receipt of the end of the group of commands is received by server software 510.

Figure 6A:
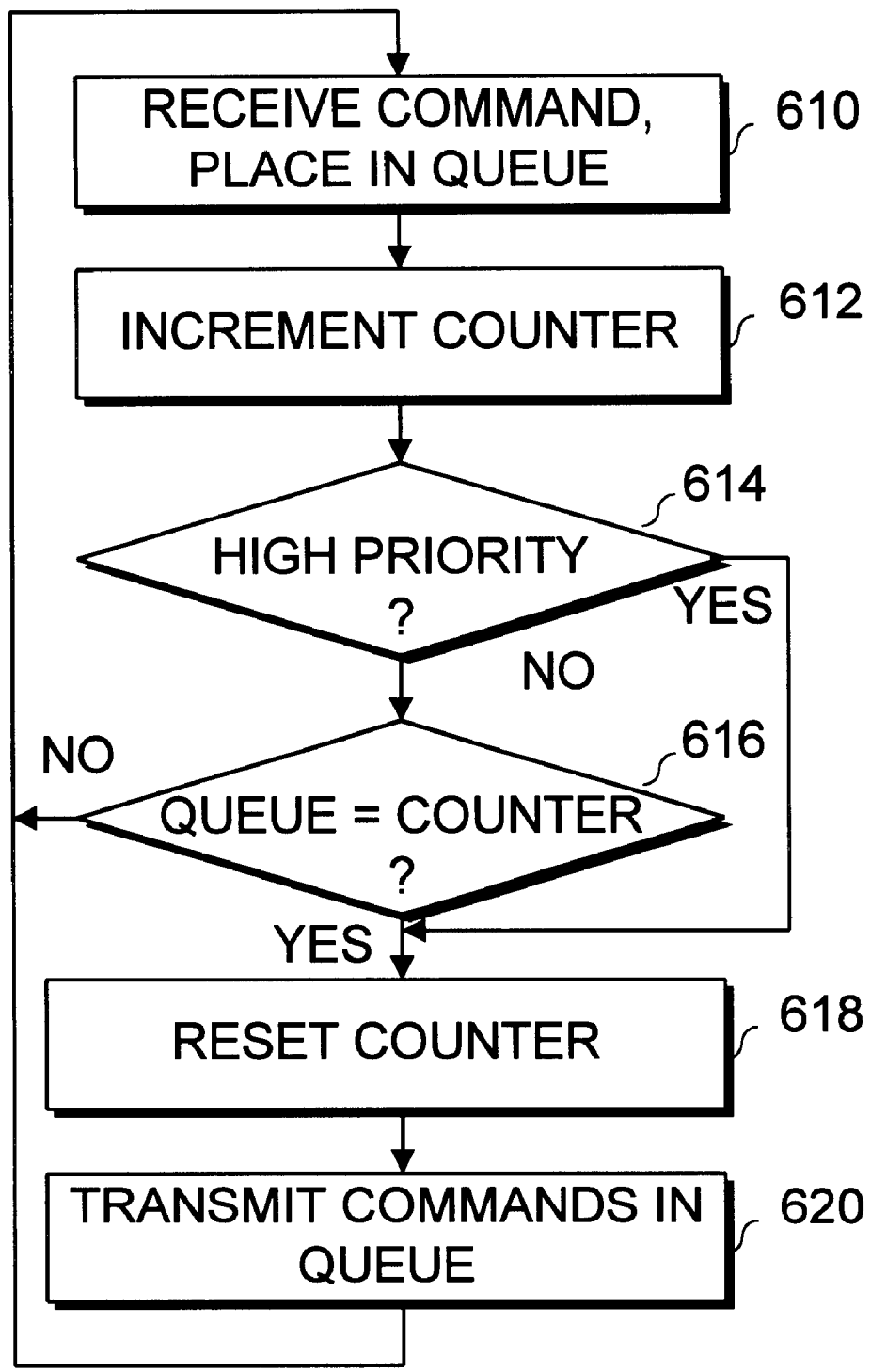
FIG. 6A is a flowchart illustrating a method of storing and forwarding server commands according to one embodiment of the present invention.

Referring now to FIG. 6A, a method of storing and forwarding server commands according to one embodiment of the present invention is shown. A command is received and placed in a queue 610. The priority of the command is identified 614 as described above, and if the command is a low priority command, the method repeats at step 610. If the command is a high priority command, the commands in the queue are transmitted 620. In one embodiment, the receipt of each command causes a counter to be incremented 612, and if the counter is equal to the number of positions of the queue, or to the number of positions in the queue plus one, the counter is reset to zero 618 and the commands in the queue are transmitted 620.

In one embodiment, the transmission step 620 is transmission to a server. In another embodiment, the transmission step 620 is to a device coupled between the device from which the command was received in step 610 and the server. In another embodiment, the steps of FIG. 6A are all performed in a server, and the transmission step 620 is to the portion of the server which executes the commands.

In one embodiment, the command placed in the queue in step 610 is flagged as being the first command in a group by altering the command received or inserting an additional command before it in the queue as described above. The transmit step 620 flags the end of the group using an integrated modification or adding an end of group command after the commands transmitted as described above.

Figure 6B:
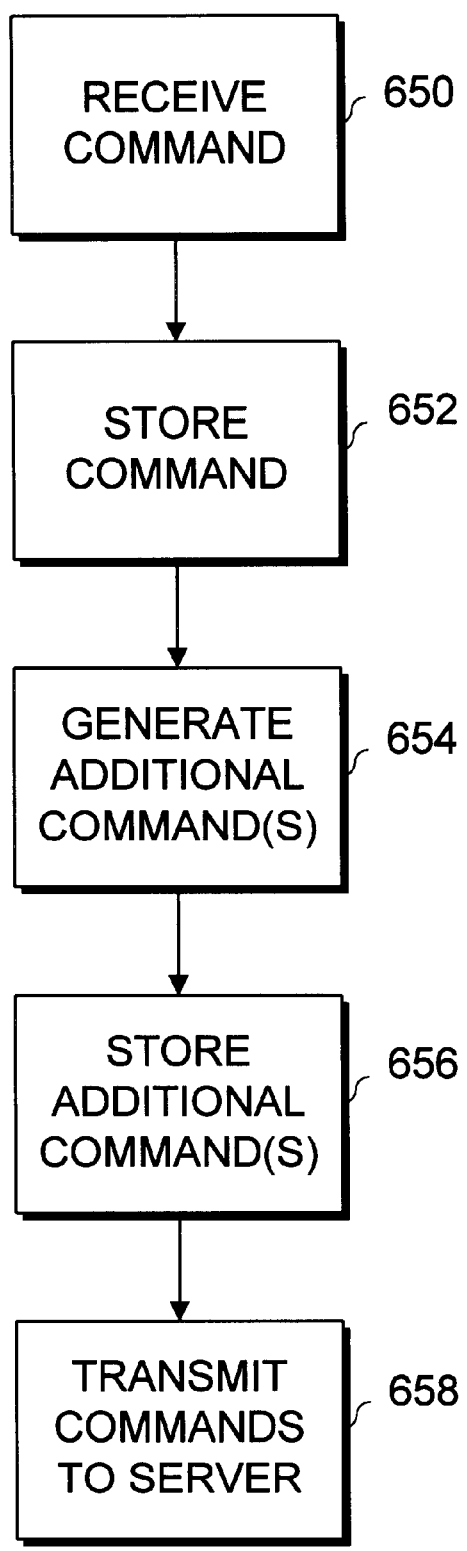
FIG. 6B is a flowchart illustrating a method of storing and forwarding server commands according to an alternate embodiment of the present invention.

Referring now to FIG. 6B, a method of storing and forwarding server commands according to an alternate embodiment of the present invention is shown. A server command is received 650 and stored 652. One or more additional commands are generated 654 and stored 656 with the command received in step 650, and the commands stored in steps 652, 656 are transmitted to a server 658, in one embodiment, each command after the first is transmitted immediately after another of the commands transmitted. In one embodiment, the additional commands cause a server to switch a session as described in copending application Ser. Nos. 08/873,057 and 08/873,057.

Figure 7:
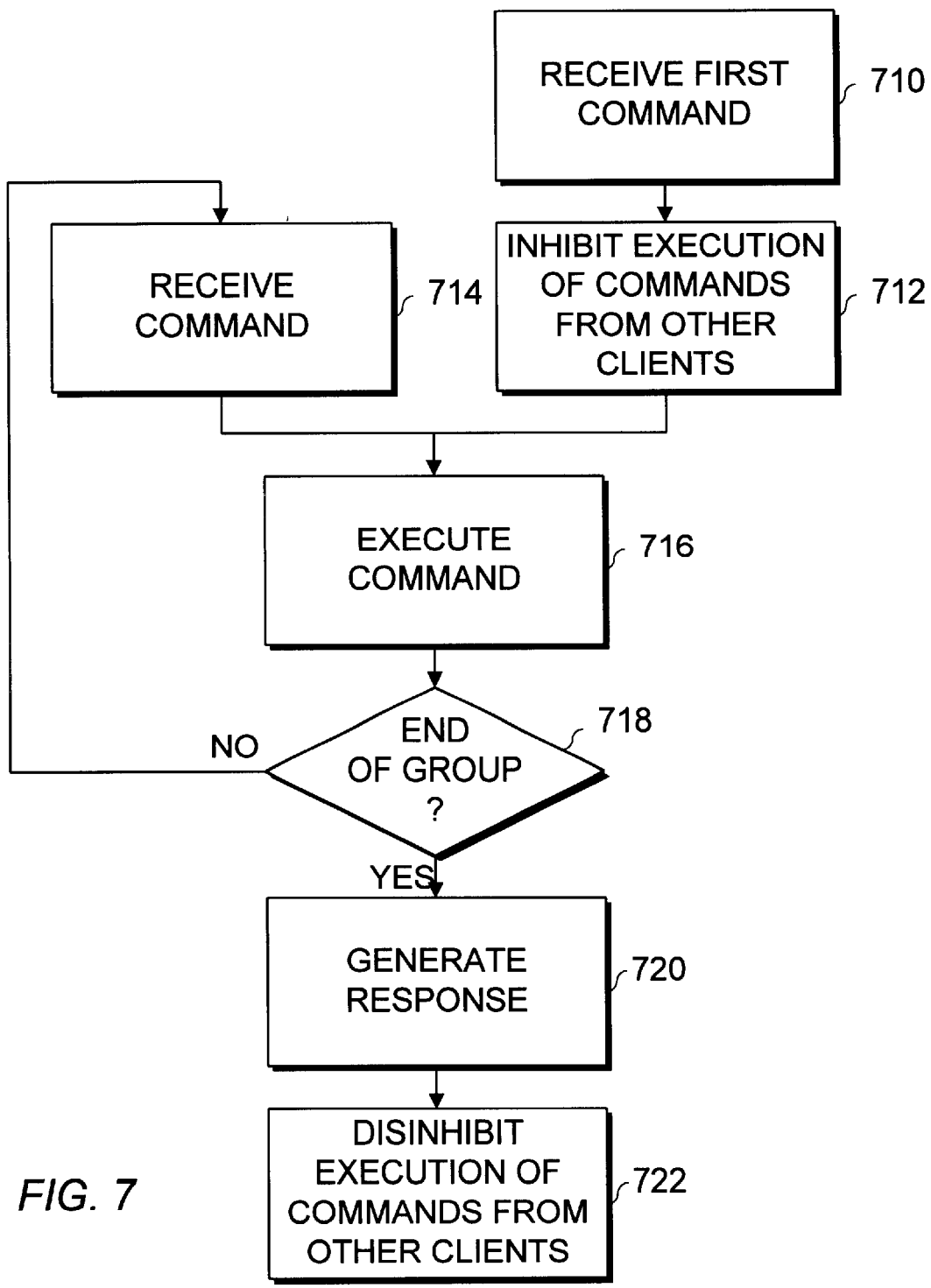
FIG. 7 is a flowchart illustrating a method of responding to a group of server commands according to one embodiment of the present invention.

Referring now to FIG. 7, a method of generating responses to commands is shown. When the first command is received 710, the processing of commands from other clients or sessions by the process receiving the first command is inhibited by the server 712. The first command is executed 716 and any additional commands in the group are received 714 and executed 716 until the end of the group of commands is identified 718 by detecting an end of group command, detecting a flag in a command that it is the end of the group, by counting the number of commands received, by detecting the command is a high priority command, or any combination of these as described above. Following the receipt of the end of the group, a response is generated 720. The response is an information response, that is, it provides information, such as the result of a query or other similar command, other than an acknowledgment of receipt or completion of the command or error response. The execution of commands from other clients is reenabled, or disinhibited 722. In one embodiment, steps 712 and 722 are not performed, and the response is only generated for the command executed at the end of the group. In one embodiment, all commands are server commands which direct a server to perform a function. In one embodiment, the server is a database server.

What is claimed is:

1. A method of forwarding a plurality of server commands, the method comprising:

retaining, without transmitting to a server, a plurality of commands, until determining that a particular command is received that, if received by said server, would cause said server to generate a response that is not a response that only confirms receipt of said particular command by said server; and in response to determining that said particular command is received, transmitting said plurality of commands to said server;

wherein each command of said plurality of commands, if received by said server, would cause said server to generate a response that only confirms receipt of each such command by said server.

2. The method of claim 1 wherein the step of transmitting comprises sending the plurality of commands before sending the particular command.

3. The method of claim 1, wherein said plurality of commands is stored at a location remote from said server.

4. The method of claim 1, wherein the step of transmitting includes transmitting said plurality of commands to said server via a network.

5. The method of claim 1, wherein the step of retaining includes storing said plurality of commands at a location remote from said server.

6. The method of claim 5, wherein the step of storing said plurality of commands includes storing said plurality of commands at a client remote from said server.

7. The method of claim 1, wherein the steps further include determining that said particular command is received by performing one or more steps that include determining that a portion of a command code is in a command priority table.

8. The method of claim 1, wherein the steps further include determining that said particular command is received by performing one or more steps that include determining that a portion of a command code is in a particular range of values.

9. The method of claim 1, wherein the steps further include determining that said particular command is received by performing one or more steps that include determining that a portion of a command code has bits in a particular pattern.

10. A computer-readable medium carrying one or more sequences of instructions for forwarding a plurality of server commands, wherein execution of the one or more sequences of instructions by one or more processors causes the one or more processors to perform the steps of:

retaining, without transmitting to a server, a plurality of commands, until determining that a particular command is received that, if a received by said server, would cause said server to generate a response that is not a response that only confirms receipt of said particular command by said server; and in response to determining that said particular command is received, transmitting said plurality of commands to said server;

wherein each command of said plurality of commands, if received by said server, would cause said server to generate a response that only confirms receipt of each such command by said server.

11. The computer-readable medium of claim 10 wherein the step of transmitting comprises sending the plurality of commands before sending the particular command.

12. The computer-readable medium of claim 10, wherein said plurality of commands is stored at a location remote from said server.

13. The computer-readable medium of claim 10, wherein the step of transmitting includes transmitting said plurality of commands to said server via a network.

14. The computer-readable medium of claim 10, wherein the step of retaining includes storing said plurality of commands at a location remote from said server.

15. The computer-readable medium of claim 14, wherein the step of storing said plurality of commands includes storing said plurality of commands at a client remote from said server.

16. The computer-readable medium of claim 10, wherein the steps further include determining that said particular command is received by performing one or more steps that include determining that a portion of a command code is in a command priority table.

17. The computer-readable medium of claim 10, wherein the steps further include determining that said particular command is received by performing one or more steps that include determining that a portion of a command code is in a particular range of values.

18. The computer-readable medium claim of 10, wherein the steps further include determining that said particular command is received by performing one or more steps that include determining that a portion of a command code has bits in a particular pattern.

* * * * *

UNITED STATES PATENT AND TRADEMARK OFFICE
CERTIFICATE OF CORRECTION

PATENT NO. : 6,675,195 B1
DATED : January 6, 2004
INVENTOR(S) : Debashish Chatterjee et al.

It is certified that error appears in the above-identified patent and that said Letters Patent is hereby corrected as shown below:

Column 9,
Line 11, replace "if a received," with -- if received --.

Signed and Sealed this

Eleventh Day of May, 2004

JON W. DUDAS
*Acting Director of the United States Patent and Trademark Office*